(12) United States Patent
Beutler

(10) Patent No.: US 10,384,640 B2
(45) Date of Patent: Aug. 20, 2019

(54) REDUNDANT SAFETY BELT

(71) Applicant: Jörg Beutler, Holzkirchen (DE)

(72) Inventor: Jörg Beutler, Holzkirchen (DE)

( * ) Notice: Subject to any disclaimer, the term of this patent is extended or adjusted under 35 U.S.C. 154(b) by 0 days.

(21) Appl. No.: 15/352,961

(22) Filed: Nov. 16, 2016

(65) Prior Publication Data

US 2017/0136986 A1 May 18, 2017

(30) Foreign Application Priority Data

Nov. 16, 2015 (EP) ..................... 15194701

(51) Int. Cl.
*B60R 22/12* (2006.01)
*B60R 22/34* (2006.01)
*B60R 22/48* (2006.01)
*D03D 1/00* (2006.01)

(52) U.S. Cl.
CPC .............. *B60R 22/12* (2013.01); *B60R 22/34* (2013.01); *B60R 22/48* (2013.01); *D03D 1/0005* (2013.01); *B60R 2022/4816* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,707,120 | A | * | 12/1972 | Schroeder | B60C 9/0042 139/420 C |
| 3,820,843 | A | * | 6/1974 | Seo et al. | D03D 11/00 297/472 |
| 4,174,738 | A | * | 11/1979 | Berger | D03D 1/0005 139/384 R |
| 4,600,626 | A | * | 7/1986 | Ogata | B60R 22/12 139/384 R |
| 5,202,177 | A | * | 4/1993 | Kamper | A62B 35/04 139/384 R |
| 5,376,440 | A | * | 12/1994 | Koseki | D03D 1/0005 139/383 R |
| 5,634,499 | A | * | 6/1997 | Kikuchi | D03D 1/0005 139/387 R |
| 5,769,130 | A | * | 6/1998 | Brielmann | D03D 1/0005 139/22 |
| 6,203,059 | B1 | * | 3/2001 | Mazur | B60R 22/48 280/735 |

(Continued)

FOREIGN PATENT DOCUMENTS

| | | | |
|---|---|---|---|
| DE | 2449897 A1 | 4/1975 | |
| DE | 3046813 A1 * | 6/1982 | ............. B60R 22/02 |

(Continued)

OTHER PUBLICATIONS

May 4, 2016, Extended European Search Report from the European Patent Office in European Patent Application No. 15194701.7-1503, which this U.S. application claims the benefit of priority.

*Primary Examiner* — Nicole T Verley
(74) *Attorney, Agent, or Firm* — Kolitch Romano LLP

(57) ABSTRACT

The present disclosure includes a belt webbing for a safety belt system. The belt webbing may have at least one first strength member extending along the length L of the belt webbing and a second strength member extending along the length L of the belt webbing. The first strength member and the second strength member may be interconnected.

19 Claims, 2 Drawing Sheets

(56) References Cited

U.S. PATENT DOCUMENTS

| | | | |
|---|---|---|---|
| 6,533,066 B1 * | 3/2003 | O'Dell | A62B 35/04 182/3 |
| 6,540,040 B1 * | 4/2003 | Patel | B60R 22/48 180/268 |
| 6,660,668 B2 * | 12/2003 | Tanabe | D02G 3/28 139/413 |
| 6,783,186 B1 * | 8/2004 | McGanty | B60R 22/12 297/468 |
| 7,017,194 B2 * | 3/2006 | Schroth | A42B 3/0473 2/410 |
| 7,516,711 B2 * | 4/2009 | Messner | B60R 22/12 112/470.33 |
| 7,871,945 B2 | 1/2011 | Berger et al. | |
| 7,905,789 B2 * | 3/2011 | Collins | B60R 22/12 24/633 |
| 8,201,850 B2 * | 6/2012 | Browne | D03D 1/0005 280/801.1 |
| 9,540,749 B2 * | 1/2017 | Bedingfield | D07B 1/02 |
| 2002/0008376 A1 * | 1/2002 | Wittenberg | B60R 22/12 280/801.1 |
| 2004/0115390 A1 * | 6/2004 | Hess | A62B 35/04 428/99 |
| 2007/0123128 A1 * | 5/2007 | Shimazaki | D02G 3/402 442/199 |
| 2008/0290643 A1 * | 11/2008 | Hansen | B60R 22/12 280/801.1 |
| 2009/0023352 A1 * | 1/2009 | Russell | A62B 35/04 442/182 |
| 2009/0134690 A1 * | 5/2009 | Shimazaki | D03D 1/0005 297/475 |
| 2009/0266925 A1 * | 10/2009 | Browne | D03D 1/0005 242/410 |
| 2010/0025976 A1 * | 2/2010 | Murtha | B60R 22/12 280/801.1 |
| 2010/0156166 A1 * | 6/2010 | Shimazaki | D03D 1/0005 297/474 |
| 2014/0252822 A1 * | 9/2014 | Tejedor | B60R 22/26 297/232 |
| 2016/0250987 A1 * | 9/2016 | Okubo | B60R 21/18 280/729 |

FOREIGN PATENT DOCUMENTS

| | | | | |
|---|---|---|---|---|
| DE | 3446313 A1 * | 6/1986 | | D03D 1/0005 |
| DE | 4006196 A1 * | 8/1991 | | B60R 22/12 |
| DE | 10205937 A1 * | 8/2002 | | B60R 22/12 |
| DE | 102014004960 A1 * | 10/2015 | | D03D 1/0005 |
| EP | 0997358 A2 | 5/2000 | | |
| EP | 1663736 A1 | 6/2006 | | |
| GB | 1154201 A * | 6/1969 | | B60R 22/023 |
| JP | 04232143 A * | 8/1992 | | B60R 22/12 |
| WO | 03055728 A1 | 7/2003 | | |

* cited by examiner

REDUNDANT SAFETY BELT

CROSS-REFERENCE TO RELATED APPLICATION

This application claims priority to European Patent Application No. 15194701.7, filed Nov. 16, 2015, which is hereby incorporation by reference.

BACKGROUND

All kinds of belt webbing and corresponding restraint systems for protecting the occupants of all types of vehicles are known. Here, the problem arises of how to maintain the breaking strength of the belt webbing in the long term to ensure the safety of the vehicle occupants at all times and permanently. To this end, any damage caused to the belt webbing due to material fatigue or external damage must be prevented and, moreover, detected in good time. This is of considerable importance precisely for the operation of vehicles that are subject to high loads, e.g., roller coaster cars. Their belt webbings are under great stress, due to a combination of the action of high forces, e.g., acceleration, gravitational and centrifugal forces which sometimes act on the vehicle at rapid intervals and alternate between the unloaded and the loaded state, and frequent changes of passenger. For this reason, rigid bars made from, e.g., steel, are used instead of flexible straps to ensure the safety of the occupants at all times. Where belts are used, the strength of the belt webbing needs to be inspected regularly in order that damage may be detected early and appropriate safety measures taken.

SUMMARY

One or more embodiments of the present application may relate to a belt webbing for a safety belt system and a restraint system with a corresponding belt webbing.

An object of one or more embodiments of the present disclosure is to provide a belt webbing and a restraint system which make the requisite breaking strength permanently available and which are easy and flexible to use.

In one or more embodiments of the present disclosure, the belt webbing for a safety belt system has at least one first strength member extending along the length L of the belt webbing and a second strength member extending along the length L of the belt webbing, wherein the first strength member and the second strength member are interconnected.

In one or more embodiments of the present disclosure, the at least two strength members may be spaced laterally apart from each other parallel with the length L. However, two or more strength members may be disposed right next to each other, laterally and/or above one another. The strength members may, e.g., be stitched or directly connected to each other in some other way along the length L. The strength members may be designed such that each of the strength members can accommodate at least all of the fully specified or technically required breaking load or tensile load. Thus, a system is created in which safety is enhanced through redundancy.

In one or more embodiments of the present disclosure, the strength members may be cut-proof. I.e. the strength members are resistant to any kind of manipulation like cutting, tearing, etc.

In one or more embodiments of the present disclosure, the strength members serve to accommodate tensile forces. The total breaking load of the belt webbing results from the sum of the individual breaking loads of the strength members, which may be configured as tensile cords. The use of more than one strength member allows complete redundancy to be achieved, provided that each strength member on its own exhibits the total breaking load. In the case of two strength members, therefore, a total of twice the breaking load would be present. Should one strength member fail, the other member still present would have the structurally required breaking load. On account of the plurality of tensile elements, the individual breaking loads are scaled down such that, should one strength member fail, the total breaking load of the belt webbing undergoes less weakening.

In one or more embodiments of the present disclosure, this redundant design increases the safety of the belt webbing and/or belt system, such that, should part of the belt webbing or belt system fail, the person carried will remain safely secured. As a result, belt webbing restraint systems, e.g., for amusement rides, can be made that meet the highest safety requirements, a condition which could hitherto be satisfied only by heavy-duty bar constructions. The redundant design of the restraint system is of considerable importance precisely for the operation of vehicles, such as amusement cars, roller coaster cars or other rail vehicles, that are exposed to high and lasting loads. Their belt webbings and restraint systems are under great stress, due to the combined action of high force, e.g., acceleration, gravitational and centrifugal forces which sometimes act on the vehicle in rapid intervals and alternate from the unloaded to the loaded state, and of frequent changes of passengers.

In one or more embodiments of the present disclosure, the belt webbing has a support which connects the support elements to one another and/or positions them relative to one other. Thus, the belt webbing can additionally have a support, on the top of which are disposed the strength members or which is disposed laterally to and/or above the strength members. The strength members need not in principle be uniformly distributed in the support. Thus, they could be disposed at the edge to prevent damage to the belt webbing by cutting. This arrangement is moreover advantageous, respectively when the design of the belt webbing does not feature a strength member in the centre (or vice versa and/or the arrangement of the strength members is optimised in this regard), for creating a comfortably wide belt webbing combined with high flexibility. The support itself can be configured to accommodate very little or no breaking load and serves only to position the strength members.

In one or more embodiments of the present disclosure, the support and/or the strength members are made from polymer.

In one or more embodiments of the present disclosure, the support of the belt webbing comprises in particular of polymers, such as polyurethane (PU and/or PUR).

In one or more embodiments of the present disclosure, the first strength member and/or the second strength member can be embedded in the support of the belt webbing. The belt webbing can thus have a flat configuration, yielding significant benefits. Thus, the breaking strength is increased; the defined breaking strength is guaranteed even in the event of damage and thus provides protection against vandalism; wear resistance is enhanced because less tensile force is lost to abrasion. As a consequence of being embedded in the belt webbing, the strength members are protected against moisture and dirt.

In one or more embodiments of the present disclosure, the strength members can be cast into the belt webbing. Particularly, the strength members are positioned in a mold and by injecting resin into the mold in a resin molding process the strength members are enclosed by the resin and held in a predetermined position relative to each other.

In one or more embodiments of the present disclosure, the strength members can be disposed on the upper side of the support, e.g., the belt webbing can be configured with a support onto which strength members are stitched.

In one or more embodiments of the present disclosure, the strength members and/or the support can be stitched to each other.

In one or more embodiments of the present disclosure, the at least two strength members are disposed parallel with the length L and laterally spaced apart from each other.

In one or more embodiments of the present disclosure, the strength members comprise a high-strength material, such as steel, a steel cord, an aramid and/or an aramid fiber (e,g, KEVLAR®). Significant advantages over existing conventional safety bar systems accrue from the use of steel cords or strength members of similar strength made from high-strength materials in conjunction with the aforementioned embedding, and/or casting into the polymer of the belt webbing. Thus, the belt webbing is lighter than a conventional steel bar, as a result of which the vehicle weight is also reduced and structural advantages accrue. Moreover, the belt webbing takes up less space as, instead of a large bar, only a buckle and retractor are necessary, as a result of which more seats are possible in the same space. In addition, seating comfort can be increased and embarkation and disembarkation made more convenient because the bar is not in the way. By virtue of the described flat arrangement of the belt webbing, the latter always moulds itself completely to every body shape, a fact which is not possible with conventional rigid bars. It is consequently possible, for example, to simultaneously secure very small and very large people, a fact which can often otherwise be achieved only with additional technical outlay. Regular transverse grooves in the support and/or the belt webbing (in some embodiments on the inner-radius side) can serve to improve the flexibility. The strength member is also cut-proof and so affords protection against damage from outside, e.g., due to vandalism or material abrasion.

In one or more embodiments of the present disclosure, the strength members have a braided structure.

In one or more embodiments of the present disclosure, the strength members and/or the support can be designed as textile straps. These can be connected directly to each other, e.g., stitched along the length L.

In one or more embodiments of the present disclosure, if a support is present, the support forms a kind of cover strip onto which can be affixed one or more narrow strength members, e.g., in the form of safety belt webbing, by, e.g., stitching.

In one or more embodiments of the present disclosure, the strength members are dimensioned for the maximum breaking load. As each strength member already has the maximum breaking load, the safety of the user is at least doubled. The critical breaking load of the belt webbing depends inter alia on the weight of the vehicle occupant in the respective type of vehicle and the forces acting thereon that are generated by the respective type of movement, such as acceleration/ deceleration, centrifugal force, gravity, etc., plus a corresponding safety margin.

In one or more embodiments of the present disclosure, at least one strength member is electrically conductive. The strength member can be made of conductive material, the breaking of which is detected via the electrical conductivity and/or interruption in conductivity.

In one or more embodiments of the present disclosure, alternatively and/or in addition to the conductive or non-conductive strength member, the belt webbing can have at least one electrically conductive element disposed between at least two points, said element being disposed on or in the belt webbing. The electrically conductive element can extend in any conceivable form, e.g., in the form of a thread and arrangement, such as along the length or the width of the belt webbing, diagonally, straight or in an uneven arrangement on or in the belt webbing. When an electric voltage is applied and/or a potential difference is generated at the two points, current flow is generated through the conductive element.

In one or more embodiments of the present disclosure, the conductive element of the belt webbing comprises one or a plurality of conductive threads. The thread or threads are affixed to the outer sides of the belt webbing, in particular to the lower and/or the upper edge of the belt webbing, and/or incorporated into the belt webbing, e.g., by weaving. The use of threads affords the advantage of good integration into the belt webbing, combined with high electrical conductivity. The attaching of one thread or a plurality of threads to the outer side, and/or to the longitudinal edge of the belt webbing makes early detection possible of external damage to the belt webbing, by scoring, incision, etc. with a sharp object, such as a knife or scissors, etc. As a result of the damage, the thread on the outer side is damaged, as a result of which the strip conductor and accordingly also the current flow between the points is diminished or completely interrupted. The diminished or interrupted current flow is measured and detected and/or reported as a fault and any measures such as braking of the vehicle can be initiated. In addition, a further thread or a plurality of further threads can be spaced at a distance from the outer side of the belt webbing, roughly in the centre of the belt webbing. This central arrangement enables damage to the centre of the belt webbing to be detected, too, said damage being caused, e.g., by insertion of a pointed object into the centre of the belt webbing. The distance to the outer side and the number of the threads in this connection can be arbitrary.

In one or more embodiments of the present disclosure, the conductive element is arranged in a U-shape and comprises in particular of at least one (or a plurality of) conductive thread(s) in a U-shape. As a result of the U-shape of the thread, go-and-return of the conductive element through the belt webbing is facilitated, so that the structure of the current circuit and the measurement of the current can be simplified. In this connection, the current flows from a first point on one side of the belt webbing through the belt webbing to a second point on the same side of the belt webbing. Feed-in and subsequent measurement of the current can be performed on the same side of the belt webbing. In contrast, when one or a plurality of thread(s) is/are used which extend(s) through the belt webbing, the current between two opposite points is passed through the belt webbing. The current circuit must in this case be closed externally, and this entails greater outlay, e.g., through a corresponding electrical connection outside the belt webbing. Feed-in and measurement of the current are performed in this case at different points. For the U-shape thread arrangement, the two outer sides and/or the two longitudinal edges of the belt webbing are monitored by a thread section each. The thread sections extend, e.g., along the upper and lower longitudinal edge of the belt webbing, and are connected by at least one further thread section extending transversely to the longitudinal edges. The conductive element thus forms a conductive U-shaped section, each of the free ends of which corresponds to the first and the second point. This embodiment has the advantage that the current flow needs to be monitored by only one thread, as opposed to two separate threads which are each attached to the upper or lower outer side.

In one or more embodiments of the present disclosure, in addition, the conductive element can be made from two or a plurality of threads separated from each other, which are electrically connected to each other by at least one further conductive element. Two threads can be connected in accordance with the aforementioned principle of the U-shaped thread to form a conductor track in order that only the current measurement and/or the monitoring of one conductor track needs to be performed. The electrically conductive connection is created by a further thread between two points of the two threads or by loop-shaped insertion of a thread (and/or corresponding connection of the thread ends) between a plurality of points of the threads. Other connections are also conceivable. Therefore, a single or a multiple connection can be created, this occurring at any arbitrary point of the threads, such as at the beginning, in the middle and at the end of the respective thread.

In one or more embodiments of the present disclosure, as a result of the electrical conductivity of the conductive element or of the strength member, a current flow is measurable. All conceivable and known measuring instruments and methods can be considered for the measurement of the current flow. By virtue of the fact that the current flow is measurable, the belt webbing can be monitored and a weak point arising from (unnoticed) damage to the conductive strength member or at least in the region of the conductive element can be detected. Thus, it is possible to avoid any inadmissible reduction in breaking strength of the belt webbing arising from the damage. Accordingly, where a belt webbing is undamaged, a current flow is measurable which corresponds to the applied voltage in conjunction with a resistance value of the conductive element and thus represents the desired target state. Any damage to the conductive element will impair the conductivity to an extent up to and including complete interruption of the current flow. A drop in current flow and/or a complete interruption to the current flow allows of a conclusion that damage has been done to the conductive element and thus also to the belt webbing. As a way of checking the condition of the belt webbing, the current can be measured permanently and continuously or at any desired time intervals or when a certain event occurs, e.g., at the beginning of a ride or as the belt webbing is being put on.

In one or more embodiments of the present disclosure, in addition, it is also possible to measure an interruption in the current flow on account of the conductivity of the strength member. On one hand, the current flow can be tested for its presence (positive test). On the other, a drop in current flow, right up to interruption of the current flow, can be detected (negative test). It is also possible to combine both methods to ensure maximum measuring accuracy. If the measurement detects a drop in or an interruption to the current flow, the vehicle can be prevented from starting, the ride can be stopped or similar measures taken.

In one or more embodiments of the present disclosure, the present disclosure further discloses a restraint system for use in a vehicle, comprising at least one belt webbing and at least one locking member. The belt webbing also requires redundant connection with a corresponding restraint system. The locking member can be any known element, such as a belt buckle with corresponding holder. The belt tongue (buckle) can be mounted with two separate attachments to the belt webbing (e.g., two separate clamps in the case of one belt webbing, two separate seams in the case of connected belt webbings). The belt tongue itself can be implemented in duplicate for the purpose of redundancy.

In one or more embodiments of the present disclosure, in addition, the restraint system comprises a retractor for winding up the belt webbing. In an embodiment, the belt webbing is connected to the retractor by two redundant mountings, such that the belt cannot slide out or unroll should one attachment fail.

In one or more embodiments of the present disclosure, the restraint system comprises a monitoring apparatus, wherein the monitoring apparatus, after the locking member has closed, monitors an electrical connection created via the at least one electrically conductive element. Concurrently with or after the closing of the locking member, a voltage is applied between the two points, generating a current flow across the electrically conductive element. The current flow is permanently measured by the monitoring apparatus or at time intervals as already described above. In this regard, the current flow caused by the applied voltage (in conjunction with the resistance of the conductive element) represents the target value. Where a deviation from the target value is measured, a signal is generated. With the aid of further closed-loop and open-loop control elements, suitable follow-up and safety measures can be initiated as a result of the signal. Other ways of measuring, monitoring and controlling are also conceivable. Alternatively, the electrical connection can also already exist before the locking member is closed. This also allows permanent monitoring of the belt webbing, i.e., in the unclosed state, too. The electrical connection can be closed via the locking member or the conductor path can be closed within the belt webbing. Measurement of the current can take place inside or outside the belt webbing.

In one or more embodiments of the present disclosure, the belt webbing or restraint system for seat-securing systems and vehicles may be used with high minimum breaking loads and/or high requisite tensile strength. This is for example the case for seats in amusement devices and in rail cars, such as roller coaster cars, amusement cars etc.

DESCRIPTION OF PREFERRED EMBODIMENTS

In the following, embodiments of the belt webbing for a restraint system will be described.

Figure 1:
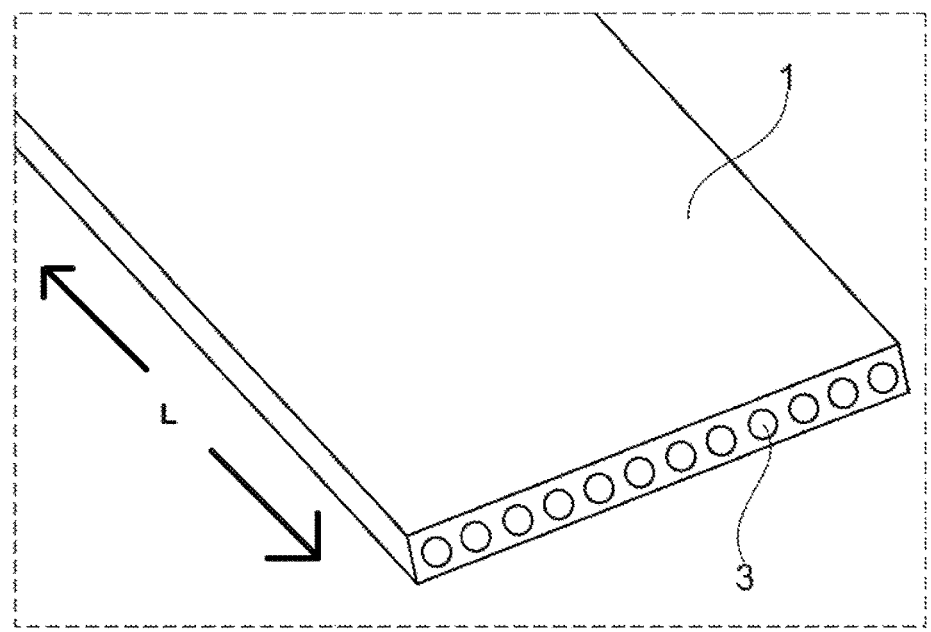
FIG. 1 is a representation of an embodiment of a belt webbing in which the strength members are cast in the form of strands in the belt webbing made from polymer.

FIG. 1 shows a belt webbing 1, which comprises polymer, e.g., 2-layer polyurethane. A plurality of strength members 3 are embedded into the belt webbing 1 at equal intervals and have a braided structure. The breaking load is thus distributed over a plurality of strength members disposed side by side along the width of the belt webbing. The belt webbing can therefore be made flat and flexible.

Figure 2:
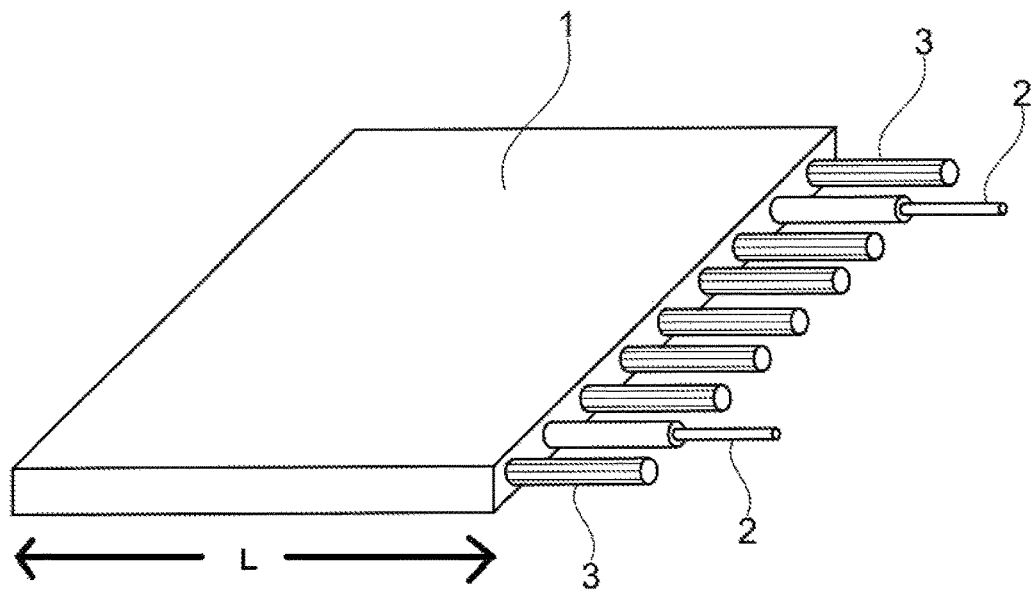
FIG. 2 is a representation of an embodiment of a belt webbing in which the strength members comprise conductive elements.

FIG. 2 shows a further belt webbing 1, which is also made of polymer. Here, too, a plurality of strength members 3 are embedded into the belt webbing 1 at equal intervals. In addition, the strength members 3 have an inner conductive element 2. It is also conceivable that the respective strength members 3 in the whole are configured so as to be conductive.

Other arrangements of the belt webbing 1 and the strength members 3 and of the combination of several belt webbings are possible and are not limited to the aforementioned embodiments.

Figure 3:
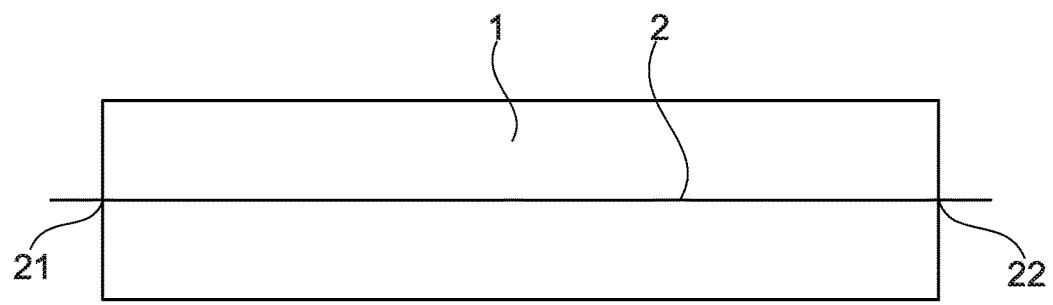
FIG. 3 is representation of an embodiment of a belt webbing, in which a conductive element in the form of a conductive thread is disposed in the centre of the belt webbing between two opposite points.
Figure 4:
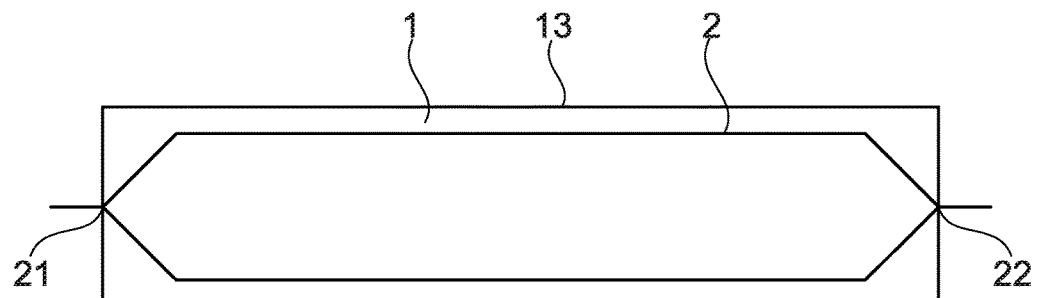
FIG. 4 is a representation of an embodiment of a belt webbing, in which a conductive element in the form of two threads is disposed between two opposite points. The two threads are disposed on the upper and lower longitudinal edge of the belt webbing and are brought together at the two points.
Figure 5:
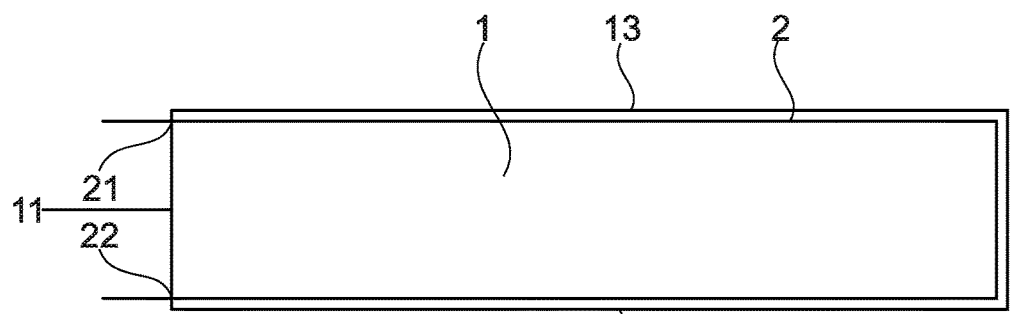
FIG. 5 is a representation of an embodiment of a belt webbing in which a conductive element in the form of a U-shaped thread is disposed between two points. The two points are disposed on one side of the strap and the thread runs along the upper and lower longitudinal edge of the belt webbing.

Further embodiments of the belt webbing 1 with a different arrangement of the electrically conductive element 2 can be seen in FIGS. 3 to 5.

Disposed between two opposite points 21, 22 in FIG. 3 is a conductive element in the form of a conductive thread 2 in the centre of the belt webbing 1.

FIG. 4 shows a further belt webbing 1, in which, disposed between two opposite points 21, 22, are conductive elements in the form of two threads 2 which are guided along the longitudinal edges 13, 14 of the belt webbing 1 and are connected and/or brought together at points 21, 22.

FIG. 5 shows a further belt webbing 1 in which a conductive element in the form of a thread 2 is disposed in a U-shape between two points 21, 22. The thread 2 runs along the upper longitudinal edge 13 and the lower longitudinal edge 14 of the belt webbing 1. The two points 21, 22 are at one end 11 of the belt webbing 1.

In one or more embodiments of the present disclosure, a belt webbing for a safety belt system has at least one first strength member extending along the length L of the belt webbing and a second strength member extending along the length L of the belt webbing, wherein the first strength member and the second strength member are interconnected. The belt webbing can have a support connecting the strength members to one another and/or positions them relative to one other. The use of a plurality of strength members facilitates a redundant securing of the passenger. Through arrangement of a further strength member, restraint of the person to be secured can be ensured in the event of damage to a strength member.

The present disclosure may include one or more of the following concepts:

A. A belt webbing for a safety belt system, wherein the belt webbing has at least one first strength member extending along the length L of the belt webbing and a second strength member extending along the length L of the belt webbing, wherein the first strength member and the second strength member are interconnected.

B. The belt webbing in accordance with paragraph A, wherein the belt webbing has a support connecting the strength members to one another and/or positions them relative to one other.

C. The belt webbing in accordance with paragraph B, wherein the support and/or the strength members consist of polymer.

D. The belt webbing in accordance with paragraph B, wherein the support consists of polymer, e.g. PU or PUR.

E. The belt webbing in accordance with any of the preceding paragraphs B to D, wherein the first strength member and/or the second strength member is embedded in the support of the belt webbing.

F. The belt webbing in accordance with paragraph A, wherein the first strength member and/or the second strength member is cast into the support of the belt webbing.

G. The belt webbing in accordance with paragraph B, wherein the strength members and/or the support are stitched to each other.

H. The belt webbing in accordance with paragraph B, wherein the strength members are disposed on the upper side of the support.

I. The belt webbing in accordance with paragraph A, wherein at least two strength members are laterally disposed parallel with the length L and/or spaced above one another.

J. The belt webbing in accordance with paragraph A, wherein the strength members consist preferably of high-strength material, such as steel, steel cord, aramid and/or Kevlar.

K. The belt webbing in accordance with paragraph A, wherein the strength members have a braided structure.

L. The belt webbing in accordance with paragraph B, wherein the support and/or the strength members are configured as textile straps.

M. The belt webbing in accordance with paragraph A, wherein at least one strength member is electrically conductive.

N. The belt webbing in accordance with paragraph A, wherein at and/or in the belt webbing is arranged at least one electrically conductive element between at least two points.

O. The belt webbing in accordance with any of the preceding paragraphs M or N, wherein a current flow is measurable owing to the electrical conductivity of the strength member or of the conductive element.

P. The belt webbing in accordance with any of the preceding paragraphs M or N, wherein an interruption to the current flow is measurable on account of the conductivity of the strength member or of the conductive element.

Q. A restraint system for use in a vehicle, wherein the restraint system comprises at least one belt webbing in accordance with paragraph A and at least one locking element.

R. The restraint system in accordance with paragraph Q, wherein the restraint system has a retractor for winding up the belt webbing.

S. The restraint system in accordance with paragraph Q, wherein it comprises a monitoring apparatus, wherein the monitoring apparatus, after the locking member has closed, monitors an electrical connection created via the at least one electrically conductive element.

Further arrangements of the conductive element are conceivable and are not limited to the aforementioned embodiments. This also applies to the number of conductive elements and the arrangement and types of connection between the conductive elements.

What is claimed is:

1. A belt webbing for a safety belt system, comprising:
the belt webbing having a specified breaking load, and a plurality of strength members including a first strength member extending along a length of the belt webbing and a second strength member extending along the length of the belt webbing, wherein the first strength member and the second strength member are interconnected by a support of the belt webbing, wherein the support is shaped as a single, one-piece layer and includes a polymer, wherein the first strength member and the second strength member are cast into the support of the belt webbing, such that the first and the second strength members are fixed relative to the support, wherein the first and the second strength members include a high-strength material that is at least one of steel, a steel cord, an aramid and/or an aramid fiber;

wherein each of the first and the second strength members has a braided structure; and wherein the plurality of strength members are configured such that if a predetermined number or fewer of the strength members fail, then a remaining number of strength members will accommodate the specified breaking load.

2. The belt webbing in accordance with claim 1, wherein the support connects the first and the second strength members to one another and/or positions them relative to one other.

3. The belt webbing in accordance with claim 2, wherein the first and the second strength members include a polymer.

4. The belt webbing in accordance with claim 2, wherein the support includes a polyurethane.

5. The belt webbing in accordance with claim 2, wherein the first and the second strength members and/or the support are stitched to each other.

6. The belt webbing in accordance with claim 2, wherein the first and the second strength members are disposed on an upper side of the support.

7. The belt webbing in accordance with claim 2, wherein the support and/or the first and the second strength members are configured as one or more textile straps.

8. The belt webbing in accordance with claim 1, wherein the first and the second strength members are laterally disposed parallel with the length and/or spaced above one another.

9. The belt webbing in accordance with claim 1, wherein at and/or in the belt webbing is arranged at least one electrically conductive element between at least two points.

10. The belt webbing in accordance with claim 9, wherein a current flow is measurable owing to an electrical conductivity of the at least one electrically conductive element.

11. The belt webbing in accordance with claim 9, wherein an interruption to a current flow is measurable on account of a conductivity of the at least one electrically conductive element.

12. A restraint system for use in a vehicle, comprising:
at least one belt webbing in accordance with claim 1, and
at least one locking element.

13. The restraint system in accordance with claim 12, further comprising a retractor configured for winding up the belt webbing.

14. The restraint system in accordance with claim 12, further comprising a monitoring apparatus, wherein the monitoring apparatus, after the locking element has closed, is configured to monitor an electrical connection created via an at least one electrically conductive element.

15. The belt webbing in accordance with claim 1, wherein each of the first and second strength members are of sufficient strength to accommodate at least all of a required tensile load of the safety belt system.

16. The belt webbing in accordance with claim 1, wherein the high strength material is of a greater degree of strength relative to a greatest degree of strength of the support.

17. The belt webbing in accordance with claim 1, wherein the polymer comprises a polymer resin, and the first strength member and the second strength member are enclosed by the polymer resin, such that the first and the second strength members are held in a predetermined position relative to each other.

18. The belt webbing in accordance with claim 1, wherein the first and the second strength members are cut-proof.

19. The belt webbing of claim 1, wherein each of the first and the second strength members is configured to accommodate the specified breaking load.

* * * * *